(12) United States Patent
Kopylov et al.

(10) Patent No.: US 11,989,598 B2
(45) Date of Patent: May 21, 2024

(54) SYSTEMS AND METHODS FOR MANAGING APPLICATION DATA

(71) Applicant: APPLYBOARD INC., Kitchener (CA)

(72) Inventors: Viktor Kopylov, Waterloo (CA); Massi Basiri, Kitchener (CA); Hiep Van Vuong, Kitchener (CA); Yue Hu, Kitchener (CA)

(73) Assignee: APPLYBOARD INC., Kitchener (CA)

( * ) Notice: Subject to any disclaimer, the term of this patent is extended or adjusted under 35 U.S.C. 154(b) by 0 days.

(21) Appl. No.: 18/094,053

(22) Filed: Jan. 6, 2023

(65) Prior Publication Data
US 2023/0229529 A1 Jul. 20, 2023

Related U.S. Application Data

(60) Provisional application No. 63/300,088, filed on Jan. 17, 2022.

(51) Int. Cl.
G06F 9/54 (2006.01)

(52) U.S. Cl.
CPC .................. G06F 9/542 (2013.01)

(58) Field of Classification Search
None
See application file for complete search history.

Primary Examiner — Brian Whipple
(74) Attorney, Agent, or Firm — BERESKIN & PARR LLP/S.E.N.C.R.L., s.r.l.

(57) ABSTRACT

Systems and methods are provided for managing program application data. An example system includes a storage device; a communication component; and a processor in communication with the one or more storage devices and a plurality of computing devices via the communication component. The processor is operable to receive, from a computing device on behalf of an applicant, initial program application data for the applicant; and store the initial program application data on the one or more storage devices. The processor is further operable to receive an initialization indicator that at least one program application of one or more program applications is to be created; generate an initial program application data object for the at least one program application; store the initial program application data object on the one or more storage devices; and designate the initial program application data object as the reference program application data object for the at least one program application.

27 Claims, 10 Drawing Sheets

SYSTEMS AND METHODS FOR MANAGING APPLICATION DATA

CROSS-REFERENCE TO RELATED APPLICATIONS

This application claims priority from U.S. Provisional Patent Application No. 63/300,088, filed on Jan. 17, 2022. The entire contents of U.S. Provisional Patent Application No. is herein incorporated by reference for all purposes.

FIELD

The described embodiments relate to systems and methods for managing applications. In some example embodiments, the systems and methods can relate to managing application data changes.

BACKGROUND

In today's digital age, many applications are completed online. For example, job seekers can submit applications directly to a potential employer's online application system. In another example, a third-party application system can receive applications from a prospective student for a plurality of academic programs and forward the program applications to respective institutions offering the academic programs. Such online applications can include a variety of data, typically stored in a structured database.

Application data can be collected from applicants over time. For example, applicants may complete a first portion of an application in a first instance. In a second instance at a later time, applicants can resume the application and complete another portion of the application. Application data can also be revised or updated over time. That is, application data is often changing. In order to identify application data that requires revision or update, it can be desirable to keep track of the data submitted in each application. However, data included in different applications for the same applicant can vary. Accordingly, managing application data for multiple applications can be complex, untimely, and inefficient.

SUMMARY

The various embodiments described herein generally relate to systems (and associated methods) for managing applications. The disclosed methods and systems can relate to managing application data.

An example system for managing program application data includes: one or more storage devices; a communication component; and at least one processor in communication with the one or more storage devices and a plurality of computing devices via the communication component. The plurality of computing devices includes at least one computing device on behalf of an applicant. The at least one computing device on behalf of the applicant includes a computing device associated with the applicant. The at least one processor is operable to receive, from the at least one computing device on behalf of an applicant, initial program application data for the applicant. The initial program application data corresponds to one or more fields of one or more program applications. The at least one processor is further operable to store the initial program application data on the one or more storage devices; receive, from the at least one computing device on behalf of the applicant, an initialization indicator that at least one program application of the one or more program applications is to be created; generate an initial program application data object for the at least one program application; store the initial program application data object on the one or more storage devices; and designate the initial program application data object as the reference program application data object for the at least one program application. The computing device associated with the applicant is one of the plurality of computing devices. The initial program application data object can include the initial program application data.

In at least one embodiment, the at least one processor can include an event monitoring processor for publishing event messages to a communication channel and at least one consuming processor for receiving a particular event message from the communication channel and operating in response to receiving the event message.

In at least one embodiment, the event monitoring processor can be operable to publish an initial event message to the communication channel when the initialization indicator is received; and the at least one consuming processor can include a snapshot processor operable to generate the initial program application data object in response to receiving the initial event message from the communication channel.

In at least one embodiment, the at least one processor can be operable to: receive, from the computing device associated with the applicant, an initial submission indicator that at least one program application of the one or more program applications is ready for submission; in response to receiving the submission indicator, determine whether the initial program application data is validated; and if the initial program application data is validated, transmit the initial program application data object to a corresponding institutional system; otherwise, transmit a notification to the computing device associated with the applicant that the initial program application data is not validated.

In at least one embodiment, the at least one processor can be operable to: receive, from the at least one computing device on behalf of the applicant, at least one additional initial program application data for the applicant, the at least one additional initial program application data corresponding to the one or more fields of the one or more program applications; store the at least one additional initial program application data on the one or more storage devices; receive, from the computing device associated with the applicant, an initial submission indicator that at least one program application of the one or more program applications is ready for submission; in response to receiving the initial submission indicator, generate an additional initial program application data object based on the initial program application data object stored on the one or more storage devices and the at least one additional initial program application data received since the initial program application data object was generated; determine whether the initial program application data and the at least one additional initial program application data is validated; if the initial program application data and the at least one additional initial program application data is validated, store the additional initial program application data object on the one or more storage devices; designate the additional initial program application data object as the reference program application data object for the at least one program application; and transmit the additional initial program application data object to a corresponding institutional system; otherwise, discard the additional initial program application data from the one or more storage devices and the at least one additional initial program application data object.

In at least one embodiment, the at least one processor being operable to determine whether the at least one initial program application data and the at least one additional initial program application data is validated can include the at least one processor being operable to: transmit the additional initial program application data object to the computing device associated with the applicant for display at the computing device associated with the applicant; receive, from the computing device associated with the applicant, either an approval indicator or a rejection indicator for the additional initial program application data object; in response to receiving an approval indicator for the additional initial program application data object, determine that the at least one additional initial program application data is validated; and in response to receiving a rejection indicator for the additional initial program application data object, determine that the at least one additional initial program application data is not validated.

In at least one embodiment, the at least one processor being operable to discard the at least one additional initial program application data object can further include the at least one processor being operable to transmit a notification to the computing device associated with the applicant that a respective program application data is not validated.

In at least one embodiment, the event monitoring processor can be operable to publish a cumulative change event message to the communication channel when the initial submission indicator is received; and the at least one consuming processor can include a snapshot processor operable to generate the additional initial program application data object in response to receiving the cumulative change event message from the communication channel; and a record processor operable to generate and store a record designating the additional initial program application data object as the reference program application data object for the at least one program application.

In at least one embodiment, the event monitoring processor can be operable to publish an elementary change event message to the communication channel when the at least one additional initial program application data is stored on the one or more storage devices; and the record processor operable to generate and store a record corresponding to the at least one additional initial program application data in response to receiving the elementary change event message.

In at least one embodiment, one or more additional initial program application data received since the initial program application data object was generated and the initial program application data object can correspond to one or more same fields.

In at least one embodiment, the at least one processor being operable to generate an additional initial program application data object based on the initial program application data object stored on the one or more storage devices and the at least one additional initial program application data received since the initial program application data object was generated can include the at least one processor being operable to use the additional initial program application data received since the initial program application data object was generated for the one or more same fields to generate the additional initial program application data object.

In at least one embodiment, the at least one processor can be operable to: receive, from the at least one computing device on behalf of an applicant, at least one subsequent program application data for the applicant, the at least one subsequent program application data corresponding to the one or more fields of the one or more program applications; store the at least one subsequent program application data on the one or more storage devices; receive, from the computing device associated with the applicant, a subsequent submission indicator that at least one program application of the one or more program applications is ready for submission; in response to receiving the subsequent submission indicator, generate a subsequent program application data object based on at least a portion of a reference program application data object stored on the one or more storage devices and the at least one subsequent program application data received since the reference program application data object for the at least one program application was generated; and determine whether the at least one subsequent program application data is validated. If the at least one subsequent program application data is validated, the at least one processor can be operable to store the subsequent program application data object on the one or more storage devices; designate the subsequent program application data object as the reference program application data object for the at least one program application; and transmit the subsequent program application data object and a revocation request for a prior submitted program application data object to the corresponding institutional system. Otherwise, the at least one processor can be operable to discard the at least one subsequent program application data from the one or more storage devices and the at least one subsequent program application data object.

In at least one embodiment, the at least one processor being operable to determine whether the at least one subsequent program application data is validated can include the at least one processor being operable to: transmit the subsequent program application data object to the computing device associated with the applicant for display at the computing device associated with the applicant; receive, from the computing device associated with the applicant, either an approval indicator or a rejection indicator for the subsequent program application data object; in response to receiving an approval indicator for the subsequent program application data object, determine that the at least one subsequent program application data is validated; and in response to receiving a rejection indicator for the subsequent program application data object, determine that the at least one subsequent program application data is not validated.

In at least one embodiment, the at least one processor being operable to discard the at least one subsequent program application data object further can include the at least one processor being operable to transmit a notification to the computing device associated with the applicant that a respective program application data is not validated.

In at least one embodiment, the at least one processor being operable to generate a subsequent program application data object based on at least a portion of a reference program application data object stored on the one or more storage devices and the at least one subsequent program application data received since the reference program application data object for the at least one program application was generated can include the at least one processor being operable to generate a plurality of subsequent program application data objects for a plurality of program applications, each subsequent program application data based on at least a portion of a reference program application data object stored on the one or more storage devices for that program application and the at least one subsequent program application data received since the reference program application data object for that program application was generated.

In at least one embodiment, the at least one subsequent program application data for the applicant can include at least a first subsequent program application data and a second subsequent program application data received after the first subsequent program application data.

In at least one embodiment, the first subsequent program application data and the second subsequent program application data can correspond to a same field.

In at least one embodiment, the at least one processor being operable to generate a subsequent program application data object based on at least a portion of a reference program application data object stored on the one or more storage devices and the at least one subsequent program application data received since the reference program application data object for the at least one program application was generated can include the at least one processor being operable to: in response to receiving a rollback indicator for the same field, use the first subsequent program application data for the same field to generate the subsequent program application data object; otherwise, use the second subsequent program application data for the same field to generate the subsequent program application data object.

In at least one embodiment, the event monitoring processor can be operable to publish a cumulative change event message to the communication channel when the subsequent submission indicator is received; and the at least one consuming processor can include a snapshot processor operable to generate the subsequent program application data object in response to receiving the cumulative change event message from the communication channel; and a record processor operable to generate and store a record designating the subsequent program application data object as the reference program application data object for the at least one program application.

In at least one embodiment, the event monitoring processor can be operable to publish an elementary change event message to the communication channel when the at least one subsequent program application data is stored on the one or more storage devices; and the record processor can be operable to generate and store a record corresponding to the at least one subsequent program application data in response to receiving the elementary change event message.

In at least one embodiment, the at least one subsequent program application data for the applicant can include at least a first subsequent program application data and a second subsequent program application data received after the first subsequent program application data. The event monitoring processor can be operable to publish: a first elementary change event message to the communication channel when the first subsequent program application data is stored on the one or more storage devices; and a second elementary change event message to the communication channel when the second subsequent program application data is stored on the one or more storage devices. The record processor can be operable to generate and store records corresponding to the first and second subsequent program application data in response to receiving the first and second elementary change event messages, respectively.

In at least one embodiment, one or more subsequent program application data received since the reference program application data object was generated and the reference program application data object can correspond to one or more same fields.

In at least one embodiment, the at least one processor being operable to generate a subsequent program application data object based on at least a portion of a reference program application data object stored on the one or more storage devices and the at least one subsequent program application data received since the reference program application data object for the at least one program application was generated can include the at least one processor being operable to use the subsequent program application data received since the reference program application data object was generated for the one or more same fields to generate the subsequent program application data object.

In at least one embodiment, the one or more fields of one or more program applications can include at least one of a program information field, an application information field, and an applicant information field.

In at least one embodiment, the at least one program application can include a plurality of program applications, each program application having at least one of a program information field and an application information field that is different from other program applications of the plurality of program applications; and the at least one processor being operable to designate the reference program application data object for the at least one program application can include the at least one processor being operable to designate the reference program application data object for a particular program application.

In at least one embodiment, the one or more storage devices can include a snapshot storage device for storing program application data objects for the at least one program application; and a program application storage device for storing the program application data. The program application data objects can include at least one of the initial program application data object, the additional initial program application data object, or the subsequent program application data object. The program application data can include at least one of the initial program application data, the additional initial program application data, or the subsequent program application data for the one or more fields of the one or more program applications.

In another broad aspect, a computer-implemented method for managing program application data is disclosed. The method involves operating at least one processor to: receive, from at least one computing device on behalf of an applicant, initial program application data for the applicant; store the initial program application data on one or more storage devices; receive, from the at least one computing device on behalf of the applicant, an initialization indicator that at least one program application of the one or more program applications is to be created; generate an initial program application data object for the at least one program application; store the initial program application data object on the one or more storage devices; and designate the initial program application data object as the reference program application data object for the at least one program application. The initial program application data corresponds to one or more fields of one or more program applications. The initial program application data object can include the initial program application data. The at least one computing device on behalf of the applicant includes a computing device associated with the applicant.

In at least one embodiment, the method can involve operating the at least one processor to: publish event messages to a communication channel; and detect a particular event message from the communication channel and operate in response to receiving the event message.

In at least one embodiment, the method can involve operating the at least one processor to: publish an initial event message to the communication channel when the initialization indicator is received; and generate the initial program application data object in response to receiving the initial event message from the communication channel.

In at least one embodiment, the method can involve operating the at least one processor to: receive, from the computing device associated with the applicant, an initial submission indicator that at least one program application of the one or more program applications is ready for submission; in response to receiving the submission indicator, determine whether the initial program application data is validated; and if the initial program application data is validated, transmit the initial program application data object to a corresponding institutional system; otherwise, transmit a notification to the computing device associated with the applicant that the initial program application data is not validated.

In at least one embodiment, the method can involve operating the at least one processor to: receive, from the at least one computing device on behalf of an applicant, at least one additional initial program application data for the applicant; store the at least one additional initial program application data on the one or more storage devices; receive, from the computing device associated with the applicant, an initial submission indicator that at least one program application of the one or more program applications is ready for submission. The at least one additional initial program application data can correspond to the one or more fields of the one or more program applications. The method can further involve operating the at least one processor to, in response to receiving the initial submission indicator, generate an additional initial program application data object based on the initial program application data object stored on the one or more storage devices and the at least one additional initial program application data received since the initial program application data object was generated. The method can also involve operating the at least one processor to: determine whether the initial program application data and the at least one additional initial program application data is validated; if the initial program application data and the at least one additional initial program application data is validated, store the additional initial program application data object on the one or more storage devices; designate the additional initial program application data object as the reference program application data object for the at least one program application; and transmit the additional initial program application data object to a corresponding institutional system; otherwise, discard the additional initial program application data from the one or more storage devices and the at least one additional initial program application data object.

In at least one embodiment, operating the at least one processor to determine whether the at least one initial program application data and the at least one additional initial program application data is validated can involve operating the at least one processor to: transmit the additional initial program application data object to the computing device associated with the applicant for display at the computing device associated with the applicant; receive, from the computing device associated with the applicant, either an approval indicator or a rejection indicator for the additional initial program application data object; in response to receiving an approval indicator for the additional initial program application data object, determine that the at least one additional initial program application data is validated; and in response to receiving a rejection indicator for the additional initial program application data object, determine that the at least one additional initial program application data is not validated.

In at least one embodiment, operating the at least one processor to discard the at least one additional initial program application data object can further involve operating the at least one processor to transmit a notification to the computing device associated with the applicant that a respective program application data is not validated.

In at least one embodiment, the method can involve operating the at least one processor to: publish a cumulative change event message to the communication channel when the initial submission indicator is received; generate the additional initial program application data object in response to receiving the cumulative change event message from the communication channel; and generate and store a record designating the additional initial program application data object as the reference program application data object for the at least one program application.

In at least one embodiment, the method can involve operating the at least one processor to: publish an elementary change event message to the communication channel when the at least one additional initial program application data is stored on the one or more storage devices; and generate and store a record corresponding to the at least one additional initial program application data in response to receiving the elementary change event message.

In at least one embodiment, one or more additional initial program application data received since the initial program application data object was generated and the initial program application data object can correspond to one or more same fields.

In at least one embodiment, operating the at least one processor to generate an additional initial program application data object based on the initial program application data object stored on the one or more storage devices and the at least one additional initial program application data received since the initial program application data object was generated can involve operating the at least one processor to use the additional initial program application data received since the initial program application data object was generated for the one or more same fields to generate the additional initial program application data object In at least one embodiment, the method can involve operating the at least one processor to: receive, from the at least one computing device on behalf of an applicant, at least one subsequent program application data for the applicant; store the at least one subsequent program application data on the one or more storage devices; receive, from the computing device associated with the applicant, a subsequent submission indicator that at least one program application of the one or more program applications is ready for submission.

The at least one subsequent program application data can correspond to the one or more fields of the one or more program applications. The method can further involve operating the at least one processor to: in response to receiving the subsequent submission indicator, generate a subsequent program application data object based on at least a portion of a reference program application data object stored on the one or more storage devices and the at least one subsequent program application data received since the reference program application data object for the at least one program application was generated. The method can also involve operating the at least one processor to: determine whether the at least one subsequent program application data is validated; and if the at least one subsequent program application data is validated, store the subsequent program application data object on the one or more storage devices; designate the subsequent program application data object as the reference program application data object for the at least one program application; and transmit the subsequent program application data object and a revocation request for a prior submitted program application data object to the corresponding institutional system; otherwise, discard the at least one subsequent program application data from the one or more storage devices and the at least one subsequent program application data object.

In at least one embodiment, operating the at least one processor to determine whether the at least one subsequent program application data is validated can include operating the at least one processor to: transmit the subsequent program application data object to the computing device associated with the applicant for display at the computing device associated with the applicant; receive, from the computing device associated with the applicant, either an approval indicator or a rejection indicator for the subsequent program application data object; in response to receiving an approval indicator for the subsequent program application data object, determine that the at least one subsequent program application data is validated; and in response to receiving a rejection indicator for the subsequent program application data object, determine that the at least one subsequent program application data is not validated.

In at least one embodiment, operating the at least one processor to discard the at least one subsequent program application data object further can include operating the at least one processor to transmit a notification to the computing device associated with the applicant that a respective program application data is not validated.

In at least one embodiment, operating the at least one processor to generate a subsequent program application data object based on at least a portion of a reference program application data object stored on the one or more storage devices and the at least one subsequent program application data received since the reference program application data object for the at least one program application was generated can involve operating the at least one processor to generate a plurality of subsequent program application data objects for a plurality of program applications, each subsequent program application data based on at least a portion of a reference program application data object stored on the one or more storage devices for that program application and the at least one subsequent program application data received since the reference program application data object for that program application was generated.

In at least one embodiment, the at least one subsequent program application data for the applicant can include at least a first subsequent program application data and a second subsequent program application data received after the first subsequent program application data.

In at least one embodiment, the first subsequent program application data and the second subsequent program application data can correspond to a same field.

In at least one embodiment, operating the at least one processor to generate a subsequent program application data object based on at least a portion of a reference program application data object stored on the one or more storage devices and the at least one subsequent program application data received since the reference program application data object for the at least one program application was generated can include operating the at least one processor to: in response to receiving a rollback indicator for the same field, use the first subsequent program application data for the same field to generate the subsequent program application data object; otherwise, use the second subsequent program application data for the same field to generate the subsequent program application data object.

In at least one embodiment, the method can involve operating the at least one processor to: publish a cumulative change event message to the communication channel when the subsequent submission indicator is received; generate the subsequent program application data object in response to receiving the cumulative change event message from the communication channel; and generate and store a record designating the subsequent program application data object as the reference program application data object for the at least one program application.

In at least one embodiment, the method can involve operating the at least one processor to: publish an elementary change event message to the communication channel when the at least one subsequent program application data is stored on the one or more storage devices; and generate and store a record corresponding to the at least one subsequent program application data in response to receiving the elementary change event message.

In at least one embodiment, the at least one subsequent program application data for the applicant can include at least a first subsequent program application data and a second subsequent program application data received after the first subsequent program application data. The method can involve operating the at least one processor to publish a first elementary change event message to the communication channel when the first subsequent program application data is stored on the one or more storage devices; publish a second elementary change event message to the communication channel when the second subsequent program application data is stored on the one or more storage devices; and generate and store records corresponding to the first and second subsequent program application data in response to receiving the first and second elementary change event messages, respectively.

In at least one embodiment, one or more subsequent program application data received since the reference program application data object was generated and the reference program application data object can correspond to one or more same fields.

In at least one embodiment, operating the at least one process to generate a subsequent program application data object based on at least a portion of a reference program application data object stored on the one or more storage devices and the at least one subsequent program application data received since the reference program application data object for the at least one program application was generated can involve operating the at least one processor to use the subsequent program application data received since the reference program application data object was generated for the one or more same fields to generate the subsequent program application data object.

In at least one embodiment, the one or more fields of one or more program applications can include at least one of a program information field, an application information field, and an applicant information field.

In at least one embodiment, the at least one program application can include a plurality of program applications. Each program application can have at least one of a program information field and an application information field that is different from other program applications of the plurality of program applications. Operating the at least one processor to designate the reference program application data object for the at least one program application can involve operating the at least one processor to designate the reference program application data object for a particular program application.

In at least one embodiment, storing at least one of the initial program application data object, the additional initial program application data object, or the subsequent program application data object on the one or more storage devices can involve storing at least one of the initial program application data object, the additional initial program application data object, or the subsequent program application data object in a snapshot storage device; and storing at least one of the initial program application data, the additional initial program application data, or the subsequent program application data for the one or more fields of the one or more program applications on the one or more storage devices can involve storing at least one of the initial program application data, the additional initial program application data, or the subsequent program application data for the one or more fields of the one or more program applications in a program application storage device.

BRIEF DESCRIPTION OF THE DRAWINGS

Several embodiments will now be described in detail with reference to the drawings, in which.

Figure 1:
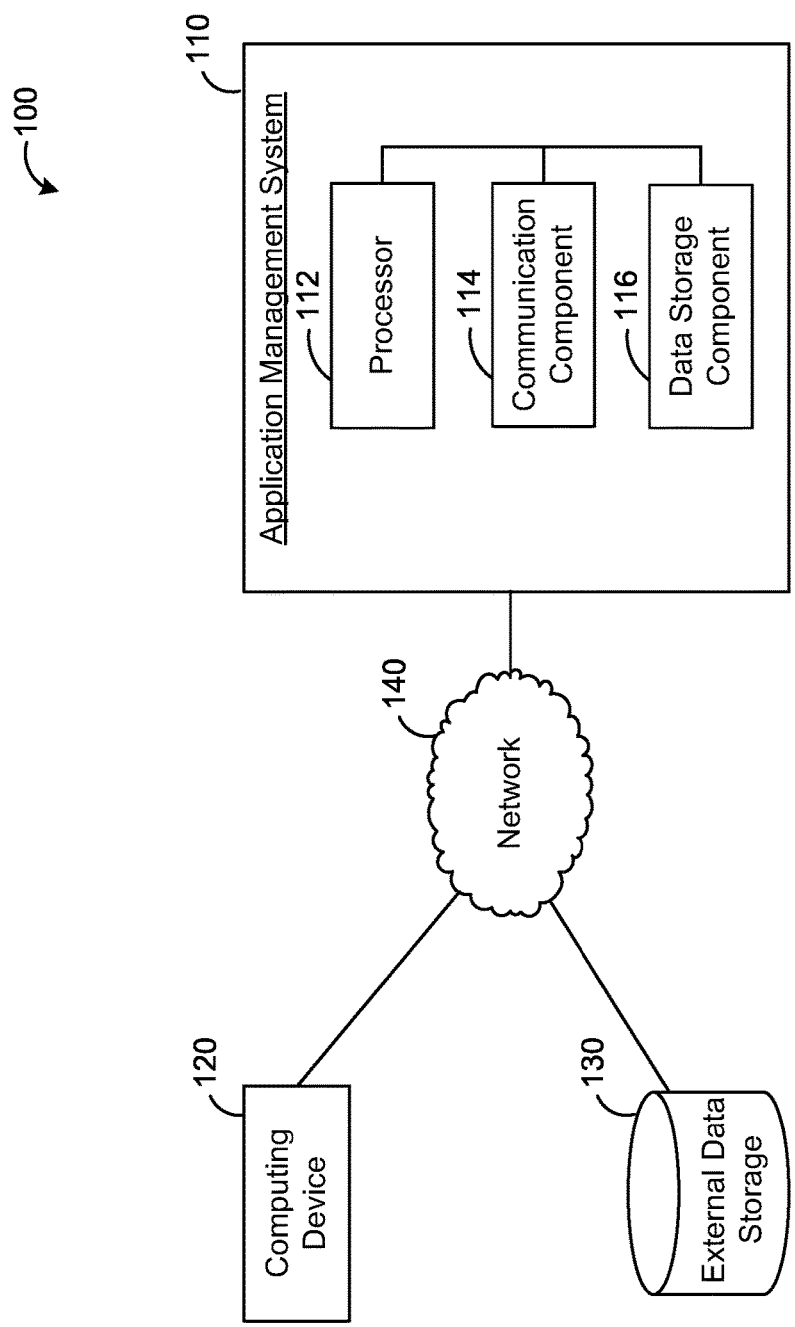
FIG. 1 is a block diagram of components interacting with an example application management system, in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

The various embodiments described herein generally relate to methods (and associated systems configured to implement the methods) of managing application data. Applications can be directed to a variety of opportunities, including but not limited to academic programs, employment, certifications, financial products, insurance products, and social services. A receiving entity can assess the application and determine whether the application is successful or not. For example, receiving entities can include but is not limited to academic institutions, employers, licensing bodies, financial service providers, insurance providers, and government or non-profit entities. Furthermore, applicants can be an individual or an entity, such as a corporation.

Applications can include a variety of fields, to which the applicants provide data. Application data is typically stored in a structured database. Application data can be collected in a piecemeal fashion and application data can be updated over time.

For example, an application to an academic program may require personal information, academic information, writing samples, and letters of recommendation. Upon creation of an application (i.e., starting the application), the applicant can provide some information from a computing device associated with the applicant. For example, personal information can include a name, mailing address, residential address, and birthdate and academic information can include a school name, courses, and grades. The applicant can provide any such information that is readily available to the applicant. At a later time, the applicant can provide additional information, such as writing samples, letters of recommendation, additional courses and grades and also modify previously provided information (e.g., correcting courses or grades previously provided).

In addition, an applicant can submit multiple applications with different program application data. For example, a program application can include writing samples but another program application may not require or include writing samples.

In addition, until an application is submitted, application data (i.e., data corresponding to fields of an application) can be added, modified, and/or removed. It can be desirable to know if and when application data related to a particular application has been modified. This can also be desirable when an agent provides application data for, or on behalf of, an applicant.

Reference is now made to FIG. 1, which illustrates a block diagram 100 of components interacting with an example application management system 110. As shown in FIG. 1, the application management system 110 is in communication with a computing device 120 and an external data storage 130 via a network 140.

The application management system 110 includes a management processor 112, a management communication component 114, and a management data storage component 116. The application management system 110 can be provided on one or more computer servers that may be distributed over a wide geographic area and connected via the network 140.

The application management system 110 can perform various functions related to processing applications. For example, the application management system 110 can receive application data for an application and transmit the application data to an employer accepting applications. Again, the application data can be related to an applicant and/or the application data can also be used for a plurality of applications. The application management system 110 can receive applications for a plurality of employment opportunities and transmit applications to respective employers accepting applications. The plurality of employment opportunities can be with one or more employers.

In another example, the application management system 110 can receive program application data for an academic program and transmit the program application data to an institution offering the academic program. The program application data can also be used for a plurality of applications. The application management system 110 can receive program application data for a plurality of academic programs and transmit program applications to respective academic programs. The plurality of academic programs can be associated with one or more institutions. For example, the plurality of academic programs can be at one or more academic institutions.

It will be appreciated that there can be a wide variety of application data. Application data can include, but is not limited to, personal information and/or records related to education, employment, training, certificates, volunteer activities, extracurricular activities, and publications.

The management processor 112, the management communication component 114, and the management data storage component 116 can be combined into a fewer number of components or can be separated into further components. The management processor 112, the management communication component 114, and the management data storage component 116 may be implemented in software or hardware, or a combination of software and hardware.

The management processor 112 can operate to control the operation of the application management system 110. The management processor 112 can initiate and manage the operations of each of the other components within the application management system 110. The management processor 112 may be any suitable processors, controllers or digital signal processors that can provide sufficient processing power depending on the configuration, purposes and requirements of the application management system 110. In some embodiments, the management processor 112 can include more than one processor with each processor being configured to perform different dedicated tasks.

The management communication component 114 may include any interface that enables the application management system 110 to communicate with other devices and systems. In some embodiments, the management communication component 114 can include at least one of a serial port, a parallel port or a USB port. The management communication component 114 may also include at least one of an Internet, Local Area Network (LAN), Ethernet, Firewire, modem or digital subscriber line connection. Various combinations of these elements may be incorporated within the management communication component 114.

For example, the management communication component 114 may receive input from various input devices, such as a mouse, a keyboard, a touch screen, a thumbwheel, a track-pad, a track-ball, a card-reader, voice recognition software and the like depending on the requirements and implementation of the application management system 110.

The management data storage component 116 can include RAM, ROM, one or more hard drives, one or more flash drives or some other suitable data storage elements such as disk drives, etc. Similar to the management data storage component 116, the external data storage 130 can also include RAM, ROM, one or more hard drives, one or more flash drives or some other suitable data storage elements such as disk drives, etc.

The management data storage component 116 and the external data storage 130 can also include one or more databases for storing program application data. Program application data can relate to program information, applicant information, or application information.

Program information generally relates to the opportunity and/or receiving entity of the application, such as but not limited to, academic programs at an academic institution, employment at an employer, certification by a licensing body, financial products from a financial service provider, insurance products from an insurance provider, or social services from a government or non-profit entity.

Applicant information generally relates to the application, such as but not limited to, personal information (e.g., name, mailing address, residential address, birthdate, visa information), academic information (e.g., school name, dates attended, courses, and grades), employment information (e.g., employer name, dates of employment, positions), extracurricular information, volunteer information, and other information related to the applicant (e.g., writing samples, generic letters of recommendation).

Application information generally relates to information provided to satisfy requirements of a particular program application, such as but not limited to, written statements that respond to a particular question of the program application, or letters of recommendation that are tailored to the particular program.

The computing device 120 can include any networked device operable to connect to the network 140. A networked device is a device capable of communicating with other devices through a network such as the network 140. A networked device may couple to the network 140 through a wired or wireless connection. Although only one computing device 120 is shown in FIG. 1, it will be understood that more computing devices 120 can connect to the network 140.

The computing device 120 may include at least a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these.

The computing device 120 can be associated with any one of an applicant, an administrator of a program at an institution, or an administrator of an employment opportunity with a potential employer. The applicant and/or administrators can provide authentication credentials to access the network 140 and transmit data to the application management system 110.

The network 140 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the application management system 110, the computing device 120 and the external data storage 130.

Figure 2:
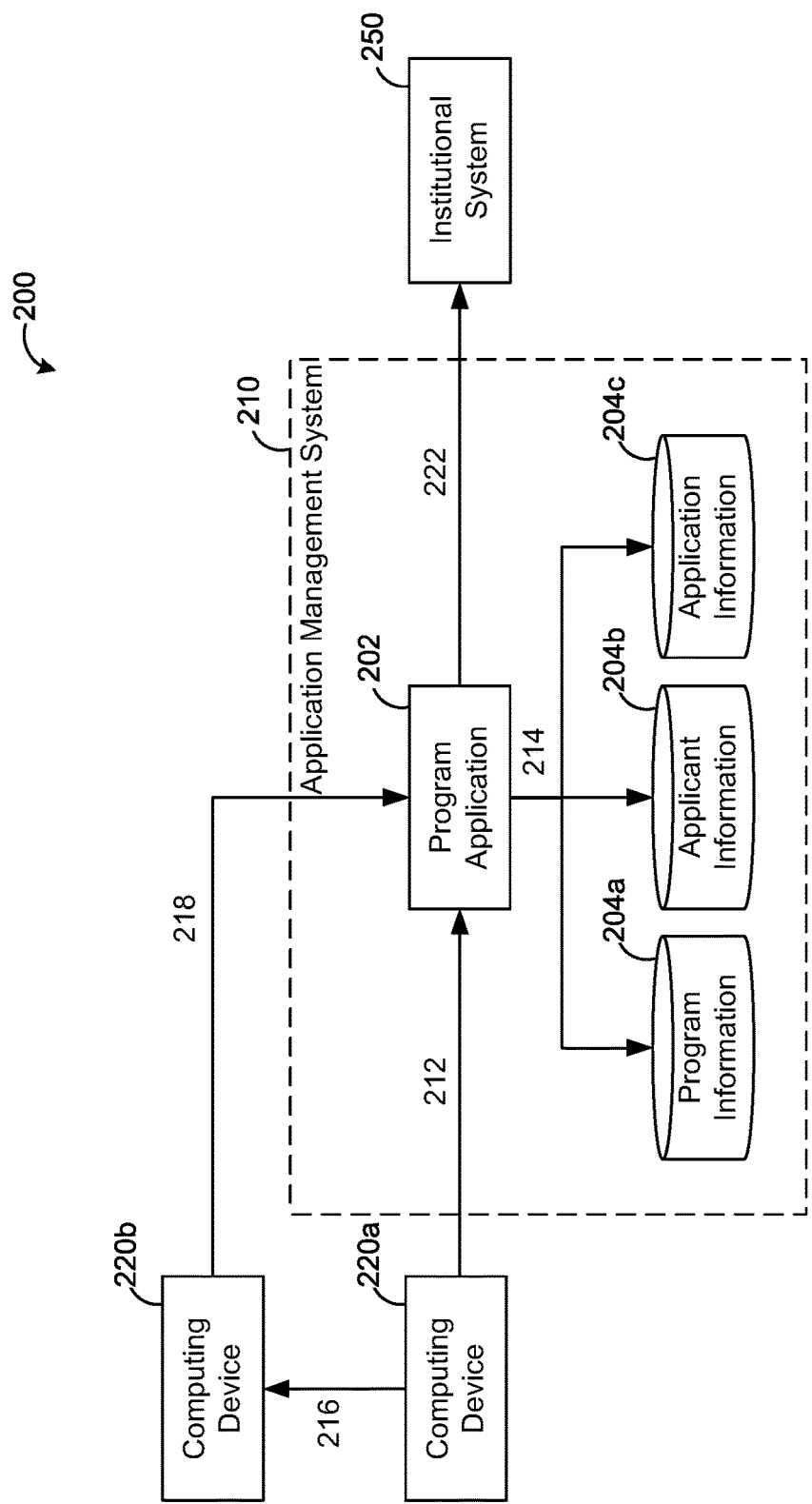
FIG. 2 is a block diagram of a typical workflow for managing applications.

Reference is now made to FIG. 2, which illustrates a typical workflow 200 for managing applications. Workflow 200 can be implemented by an application management system, such as application management system 210. Similar to application management system 110, application management system 210 can be in communication with one or more computing devices, such as computing devices 220a and 220b and institutional system 250. Institutional system 250 can include any number of processors, communication components, and data storage components. It will be understood that although only one institutional system 250 is shown in FIG. 2, the application management system 210 can be in communication with more institutional systems 250. Furthermore, the application management system 210 can be provided on one or more computer servers that may be distributed over a wide geographic area and connected via a network.

Workflow 200 can begin with a user, via computing device 220a, providing 212 program application data for a program application 202 to the application management system 210. Program application data can relate to program information 204a, applicant information 204b, or application information 204c. Upon receipt of the program application data, the application management system 210 can store the program application data into a respective data structure for each of the program information 204a, applicant information 204b, or application information 204c.

After the user at computing device 220a has provided program application data to the application management system 210, the user may alert 216 a user at computing device 220b that the program application 202 has been updated. Such an alert can be a phone call, text message, or email provided via the user computing devices 220a, 220b.

Upon receipt of the alert that program application data has changed, the user at computing device 220b can review the program application 202. The user can determine that the program application 202 is ready for submission, and instruct 218 same to the application management system 210. The application management system 210 can subsequently prepare and transmit 222 the program application 202 to a respective institutional system 250.

However, after the program application 202 is submitted, it may be necessary to re-submit the program application 202. For example, the user at computing device 220b may prepare another program application 202 using the same applicant information 204b and upon reviewing the program application 202, discover that there is an error in the applicant information 204b (e.g., wrong phone number, address, or any other information). That is, the user at computing device 220b may manually review the submitted program application 202 to determine that a discrepancy exists and that the submitted program application requires correction and re-submission. However, manual review can be inaccurate and bear a high error or miss rate (i.e., error may not be detected in the manual review).

In another example, computing device 220a or 220b may make an update to the applicant information 204b while the application management system 210 is in the process of preparing the program application 202 for transmission. As a result, the program application 202 may be submitted using the old application information 204c. Such a discrepancy may not be detected until a manual review of the submitted program application 202 is conducted. Furthermore, such a manual review can be highly inaccurate, inefficient, time consuming, and require significant resources.

Upon discovery of that a submitted program application 202 contains a discrepancy, the previously submitted program application 202 may need to be revoked and a new program application may need to be created and re-submitted. The process of identifying discrepancies with a submitted program application 202, revoking the submitted program application 202, and creating and submitting a new program application takes time. This process can impact the applicant's chances of being accepted if the submission period that the institutional system 250 is accepting applications closes before the new program application is submitted.

As shown in FIG. 2, workflow 200 can involve two computing devices 220a and 220b. For example, computing device 220a can be operated by an agent for the applicant and computing device 220b can be operated by the applicant. In another example, another computing device can be operated by a user providing a recommendation letter or referral information for the applicant. In another example, another computing device can be operated by a user providing applicant information, such as previous academic history information for the applicant. In at least one embodiment, workflow 200 can involve only one computing device. That is, an applicant can provide program application data as well as instructions to submit a program application.

Figure 3:
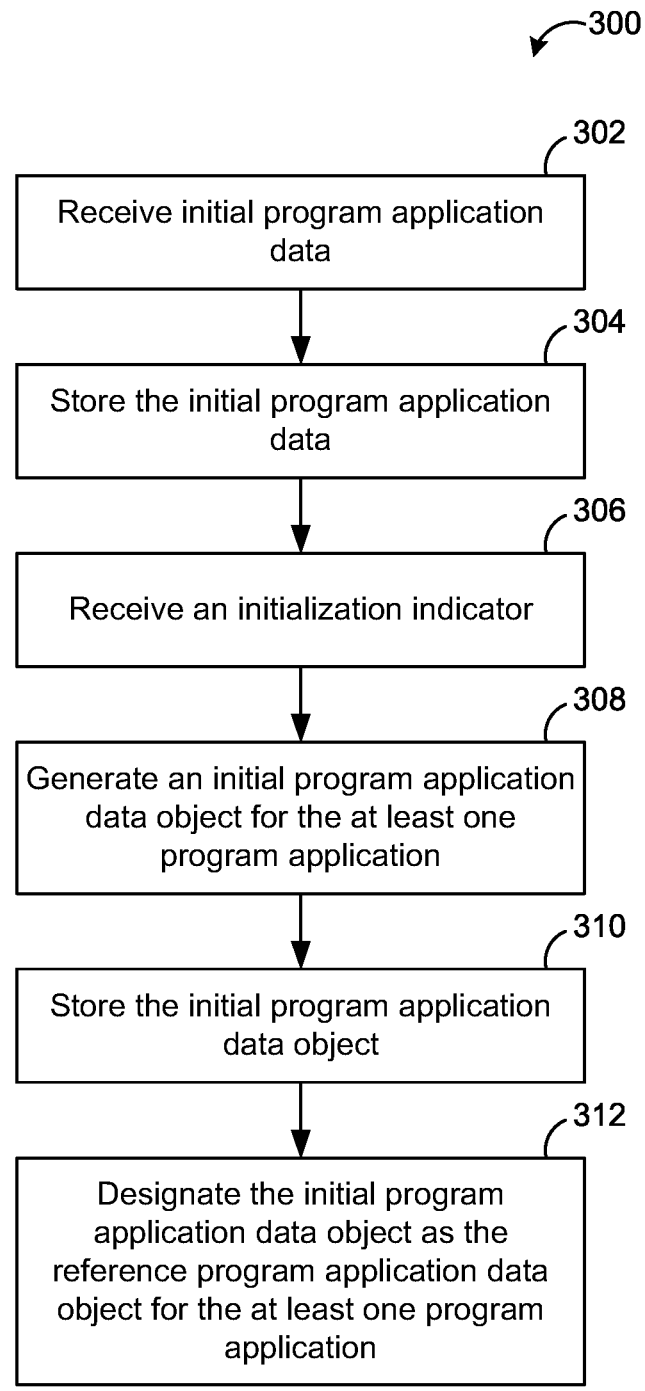
FIG. 3 is a flowchart of an example embodiment of various methods of managing program application data.

Reference is now made to FIG. 3, which illustrates a flowchart of an example method 300 for managing program application data, in accordance with an example embodiment. To assist with the description of method 300, reference will be made simultaneously to FIG. 6, which illustrates a block diagram 600 of components interacting with an application management system. An application management system, such as application management system 110 having a processor 112, can be configured to implement the method 300.

Method 300 can begin at 302 with the receipt of initial program application data for an applicant at application management system 110. The initial program application data can be transmitted via a network, such as network 140, from a computing device, such as computing device 120a. The initial program application data can correspond to one or more fields of a program application 202, such as program information 204a, applicant information 204b, or application information 204c. Applicant information 204b can be used in multiple program applications. However, each program application 202 generally includes unique program information 204a and application information 204c. In at least one embodiment, the receipt of initial program application data can relate to registration of an applicant with the application management system 110.

The initial program application data may be used for one or more program applications 202. For example, some initial program application data can be applicant information 204b that is used for a plurality of the program applications for the applicant. However, some initial program application data can be program information 204a that is for a particular program application 202 of the applicant.

Figure 6:
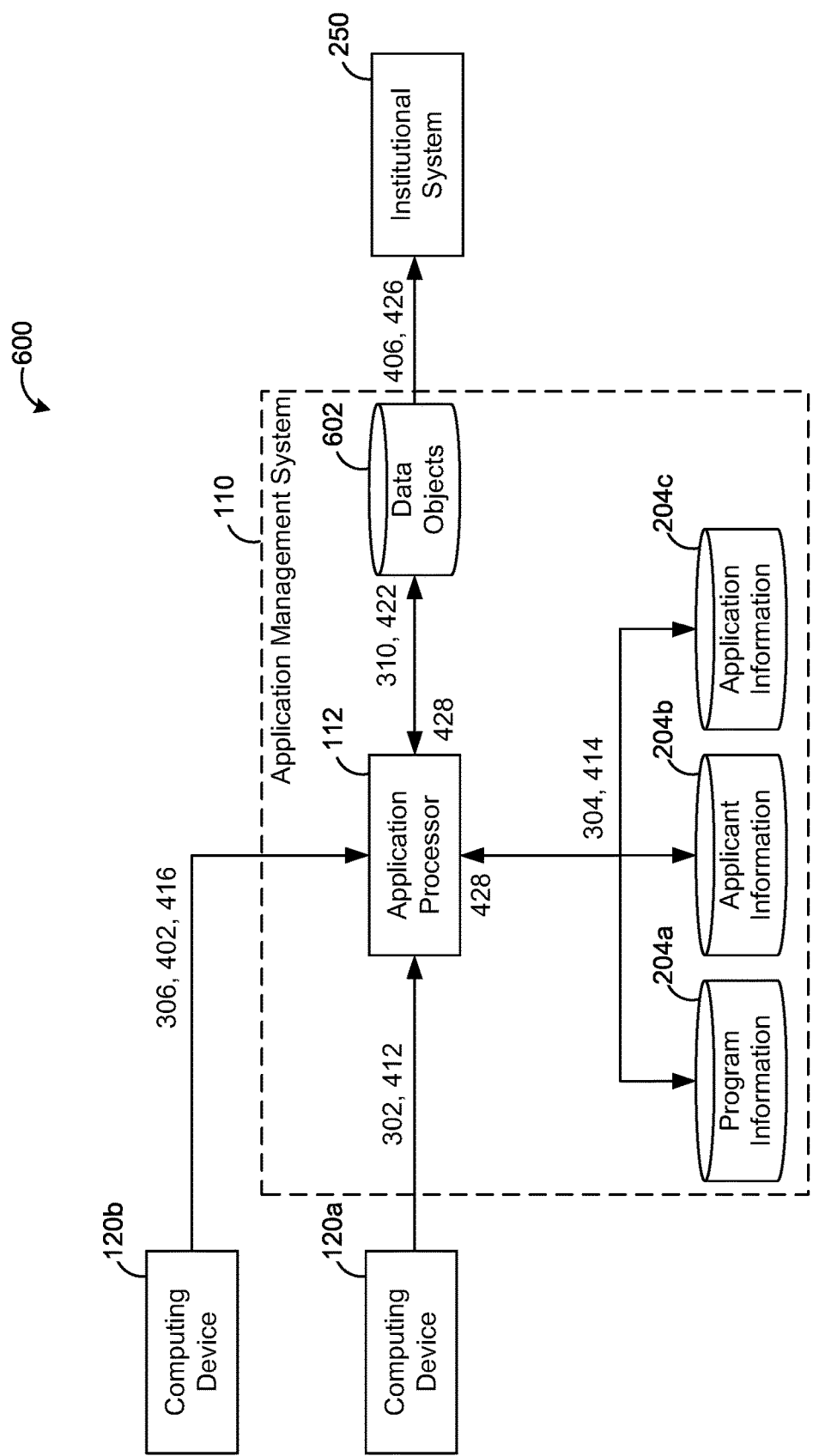
FIG. 6 is a block diagram of an example workflow for managing an initial application, in accordance with the methods of FIGS. 4A and 4B.

As shown FIG. 6, the computing device 120a can provide the initial program application data on behalf of the applicant. In at least one embodiment, the computing device 120a may not be associated with the applicant. Instead, the computing device 120a may be associated with and operated by a third party that is not the applicant. In such cases, another computing device, such as computing device 120b can be operated by the applicant. In other embodiments, the initial program application data can be provided by a computing device 120b that is associated with the applicant, that is, the computing device 120b can be operated by the applicant.

At 304, the application management system 110 can store the initial program application data on the one or more storage devices, such as management data storage component 116 or external data storage 130. The initial program application data can be stored in one or more structured databases. Furthermore, program information 204a, applicant information, and application information 204c, or any combination thereof can be stored in separate structured databases.

At 306, the application management system 110 can receive an initialization indicator that at least one program application 202 of the one or more program applications is to be created. The initialization indicator can be received from a computing device on behalf of the applicant, such as computing device 120a or 120b. In at least one embodiment, the initialization indicator can relate to payments, such a confirmation that a fee has been paid.

At 308, the application management system 110 can generate an initial program application data object for the at least one program application. The initial program application data object can include the initial program application data.

At 310, the application management system 110 can store the initial program application data object on the one or more storage devices, such as management data storage component 116 or external data storage 130. As shown in FIG. 6, in some embodiments, program application data objects 602, such as the initial program application data object, can be stored separately from the program application data.

At 312, the application management system 110 can designate the initial program application data object as the reference program application data object for the at least one program application. That is, the application management system 110 can maintain a plurality of reference program application data objects, each reference program application data object relating to a particular program application. As noted above, each program application can have unique program information 204a.

Figure 4A:
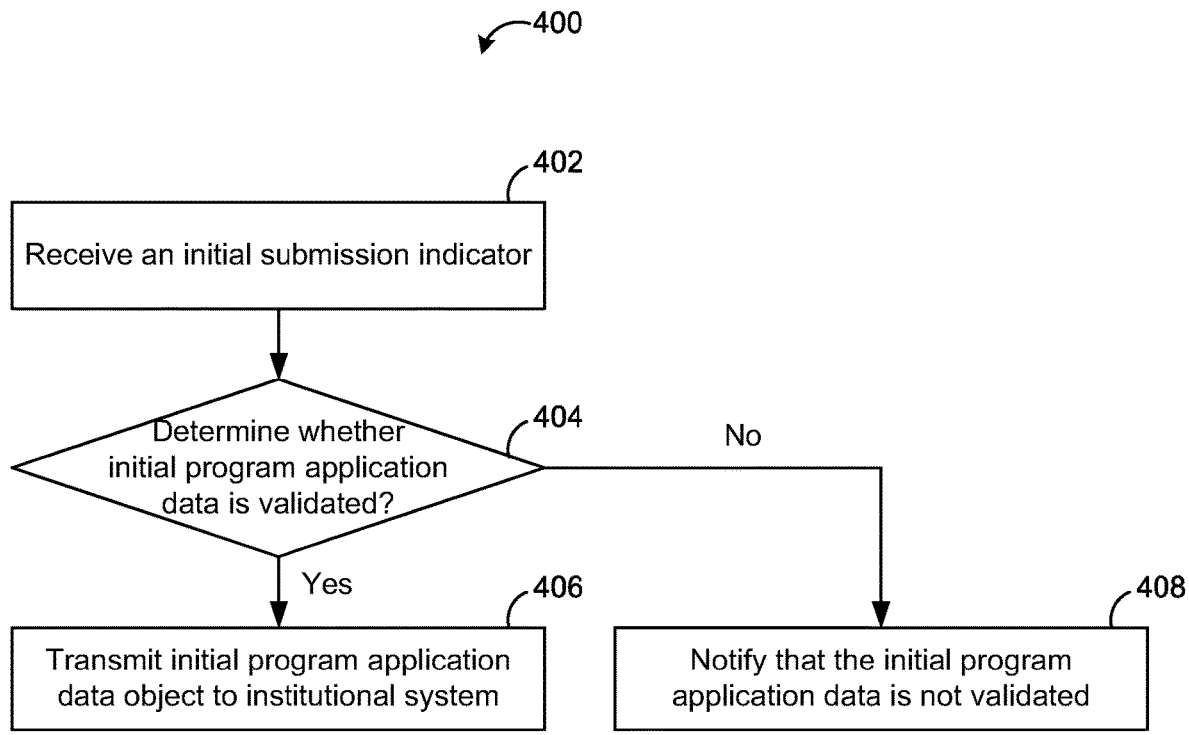
FIG. 4A is a flowchart of an example embodiment of various methods of managing an initial submission indicator of the methods of FIG. 3.

Reference now is made to FIG. 4A, which illustrates a flowchart of an example method 400 for managing an initial submission indicator, in accordance with an example embodiment. To assist with the description of method 400, reference will be made simultaneously to the block diagram 600 of FIG. 6. An application management system, such as application management system 110 having a processor 112 can be configured to implement the method 400.

At 402, the application management system 110 can receive an initial submission indicator that at least one program application 202 of the one or more program applications is ready for submission. The initial submission indicator can be received from computing device 120b associated with the applicant.

At 404, the application management system 110 can, in response to receiving the submission indicator, determine whether the initial program application data is validated.

If the initial program application data is validated, the method 400 can proceed to 406. At 406, the application management system 110 can transmit the initial program application data object 602 to a corresponding institutional system 250.

Otherwise, that is, if the initial program application data is not validated, the method can proceed to 408. At 408, the application management system 110 can transmit a notification to the computing device 120b associated with the applicant that the initial program application data is not validated.

Figure 4B:
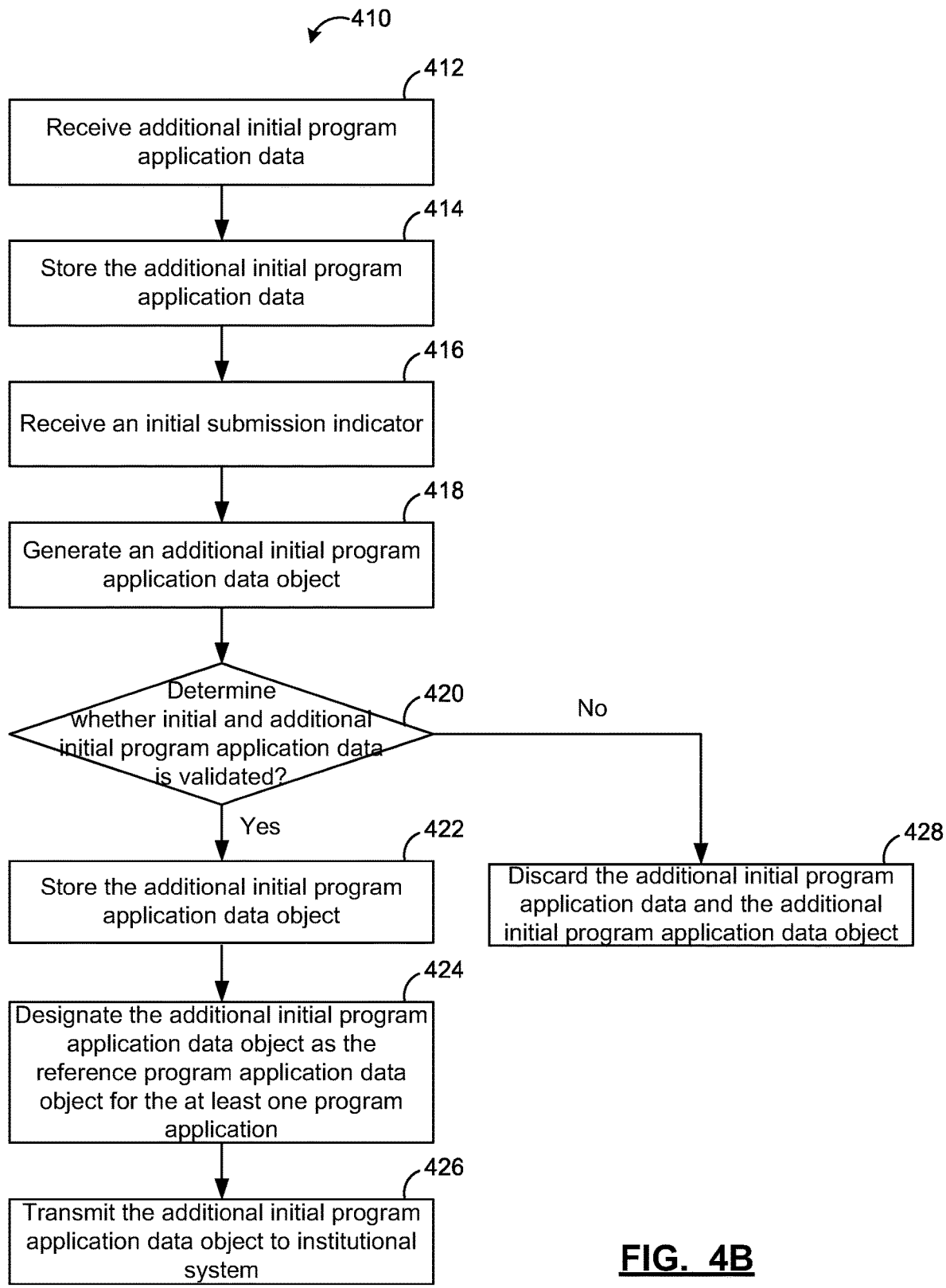
FIG. 4B is a flowchart of another example embodiment of various methods of managing an initial submission indicator of the methods of FIG. 3.

Reference now is made to FIG. 4B, which illustrates a flowchart of an example method 410 for managing an initial submission indicator. To assist with the description of method 410, reference will be made simultaneously to the block diagram 600 of FIG. 6. An application management system, such as application management system 110 having a processor 112 can be configured to implement the method 410.

At 412, the application management system 110 can receive at least one additional initial program application data for the applicant. Receiving the at least one additional initial program application data can be similar to receiving initial program application data at 302. That is, the additional initial program application data can be transmitted via a network, such as network 140, from a computing device, such as computing device 120a (as shown in FIG. 6) or computing device 120b.

The at least one additional initial program application data can correspond to the one or more fields of the one or more program applications, such as program information 204a, applicant information 204b, or application information 204c. In at least one embodiment, the one or more additional initial program application data received since the initial program application data object was generated can correspond to a different field of the program application 202 than that of the initial program application data object. That is, the one or more additional initial program application data can be information for a field for which initial application program data has not been received yet.

In at least one embodiment, the one or more additional initial program application data received since the initial program application data object was generated can correspond to a same field of the program application 202 as that of the initial program application data object. That is, the one or more additional initial program application data can be an update, or modification to a field for which initial application program data was previously received.

In some embodiments, the one or more additional initial program application data can include at least a first additional initial application data and a second additional initial program application data received after the first additional initial program application data. That is, receiving additional initial program application data at 412 can be repeated.

In at least one embodiment, the first additional initial program application data and the second additional initial program application data correspond to a same field. That is, data can be received for a particular field first and then that particular field can be updated or modified later. However, the user may also determine that they would like to revert to the first additional initial program application data instead of the second additional initial program application data. In at least one embodiment, the user can operate computing device 120 to generate and transmit a rollback indicator for the second additional initial program application data.

At 414, the application management system 110 can store the at least one additional initial program application data on the one or more storage devices 116 or 130. Storing the at least one additional initial program application data on the one or more storage devices 116 or 130 can be similar to storing the initial program application data at 304. The additional initial program application data can be stored with the initial program application data, namely the same databases.

As noted above, receiving additional initial program application data at 412 can be repeated. Likewise, storing additional initial program application data at 414 can be repeated. That is, a first additional initial program application data can be received and stored followed by a second additional initial program application data that is received and stored.

At 416, the application management system 110 can receive an initial submission indicator that at least one program application 202 of the one or more program applications is ready for submission. Similar to 402, the initial submission indicator can be received from computing device 120b associated with the applicant.

At 418, the application management system 110 can generate an additional initial program application data object based on the initial program application data object stored on the one or more storage devices 116 or 130 and the at least one additional initial program application data received since the initial program application data object was generated.

In at least one embodiment, the application management system 110 can use the additional initial program application data received since the initial program application data object was generated for the one or more same fields to generate the additional initial program application data object. Generally, when initial program application data and additional initial program application data are received for the same field, the data that was received later will be used as the current data for that field when generating a program application data object.

At 420, the application management system 110 can, in response to receiving the initial submission indicator, determine whether the initial program application data and the at least one additional initial program application data is validated.

In at least one embodiment, the application management system 110 can determine whether the at least one initial program application data and the at least one additional initial program application data is validated by transmitting the additional initial program application data object to the computing device associated with the applicant 120b. The computing device associated with the applicant 120b can display the additional initial program application data object for the user to review.

The user at computing device 120b can review the initial program application data and the additional initial program application data object and determine whether to approve or reject the initial program application data and the additional initial program application data object. That is, the user can operate computing device 120b to generate and transmit an approval indicator or a rejection indicator.

Application management system 110 can receive either an approval indicator or a rejection indicator for the initial program application data and the additional initial program application data object. In response to receiving an approval indicator for the additional initial program application data object, the application management system 110 can determine that the initial program application data and the at least one additional initial program application data is validated. In response to receiving a rejection indicator for the additional initial program application data object, the application management system 110 can determine that the initial program application data and the at least one additional initial program application data is not validated.

In some embodiments, the application management system 110 can automatically perform validation checks of the program application data that do not require user input. Such validation checks can be in lieu of user input, or supplement user input. For example, validation checks can be logical checks relating to time periods (e.g., no overlapping periods between secondary school and post-secondary school) or geographical locations (e.g., no overlapping periods between different geographic locations). Validation checks can also include third-party or external information, such as registries for certain designations or affiliations.

If the initial program application data and the additional initial program application data is validated, the method 410 can proceed to 422. At 422, the application management system 110 can store the additional initial program application data object on the one or more storage devices 116 or 130. The additional initial program application data object can be stored with the initial program application data object, namely the same database. Application management system 110 can also designate the additional initial program application data object as the reference program application data object for the at least one program application 202 at 424 and transmit the initial program application data object to a corresponding institutional system 250 at 426.

Otherwise, that is, if the initial program application data and the additional initial program application data is not validated, the method can proceed to 428. At 428, the application management system 110 can discard the initial program application data and the additional initial program application data from the one or more storage devices 116 or 130 and the at least one additional initial program application data object. In at least one embodiment, the application management system 110 can generate a rollback indicator to discard the initial program application data and the additional initial program application data from the one or more storage devices 116 or 130 and the at least one additional initial program application data object.

In some embodiments, a portion of the initial program application data and the additional initial program application data is validated and a portion of the initial program application data and the additional initial program application data is not validated. The application management system 110 can discard the respective portion of the initial program application data and the additional initial program application data that was not validated and retain the initial program application data and the additional initial program application data that was validated.

In at least one embodiment, the application management system 110 can also transmit a notification to the computing device associated with the applicant 120b that the respective program application data is not validated.

Figure 5:
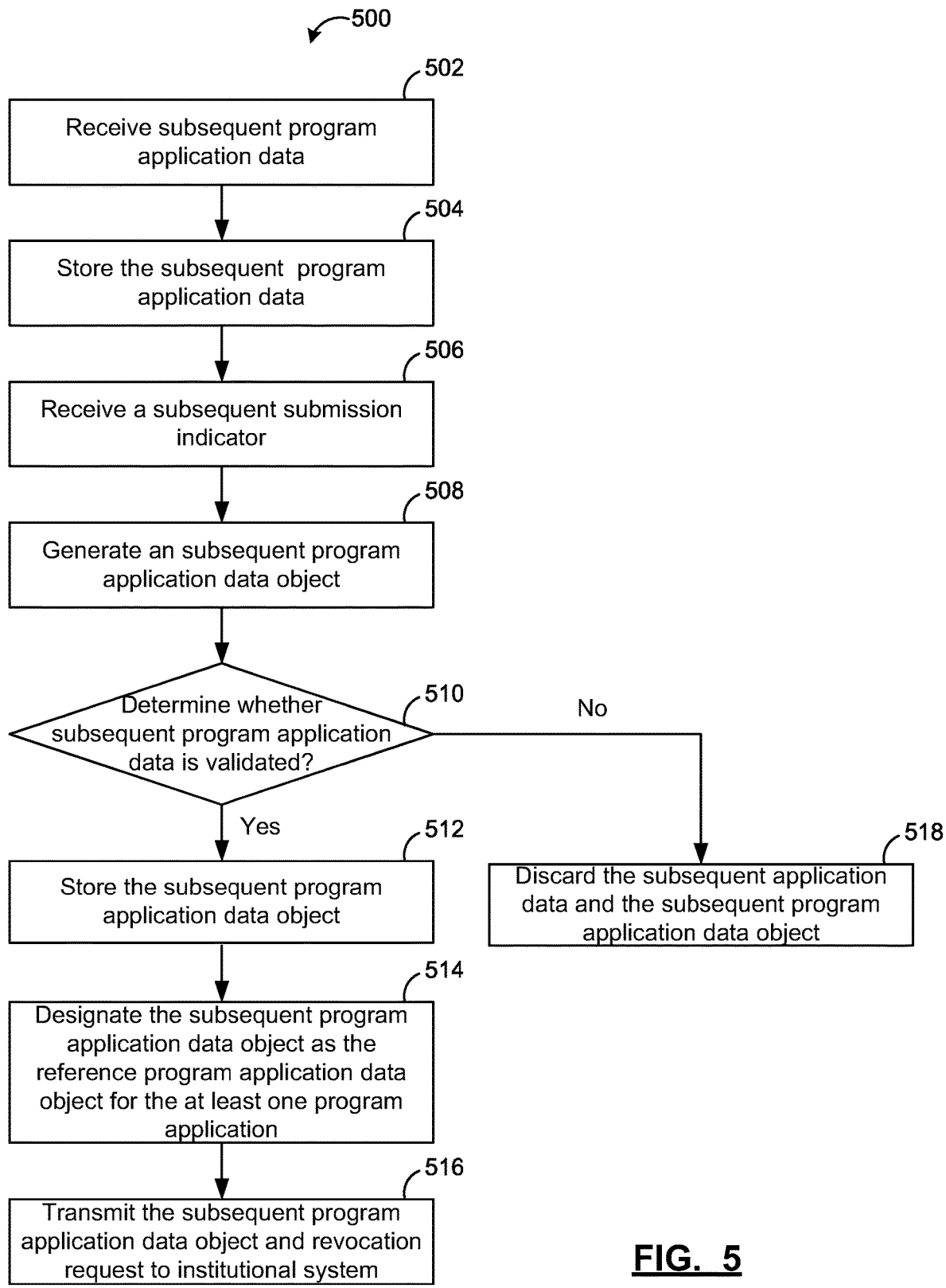
FIG. 5 is a flowchart of an example embodiment of various methods of managing a subsequent submission indicator of the methods of FIG. 3.

Reference now is made to FIG. 5, which illustrates a flowchart of an example method 500 for managing a subsequent submission indicator. To assist with the description of method 500, reference will be made simultaneously to FIG. 7, which illustrates a block diagram 700 of components interacting with an application management system. An application management system, such as application management system 110 having a processor 112 can be configured to implement the method 500.

Figure 7:
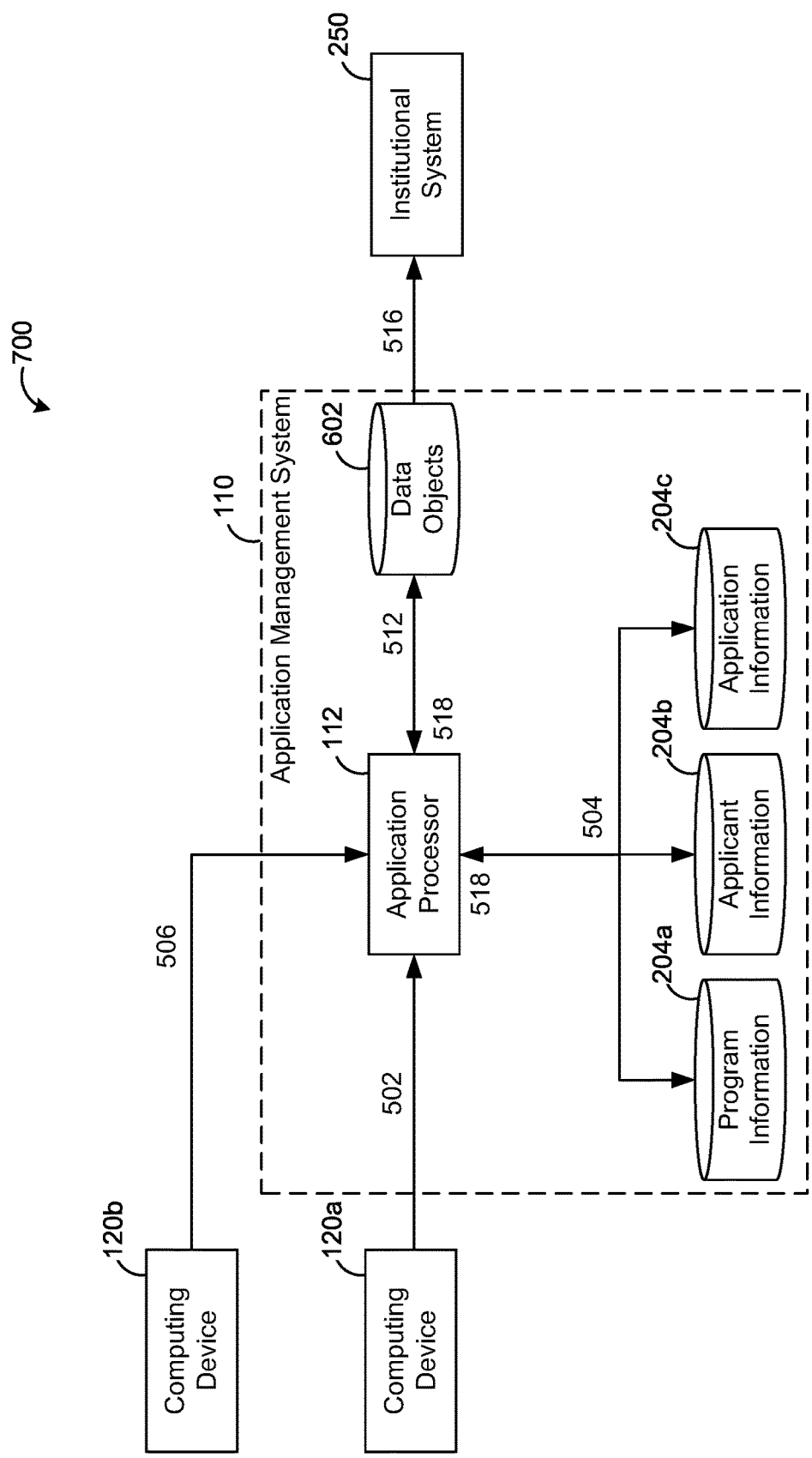
FIG. 7 is a block diagram of another example workflow for managing subsequent applications, in accordance with the methods of FIG. 5.

At 502, the application management system 110 can receive at least one subsequent program application data for the applicant. Receiving the at least one subsequent program application data can be similar to receiving initial program application data at 302 or additional initial program application data at 412. That is, the subsequent program application data can be transmitted via a network, such as network 140, from a computing device, such as computing device 120a (as shown in FIG. 7) or computing device 120b.

The at least one subsequent program application data can correspond to the one or more fields of the one or more program applications, such as program information 204a, applicant information 204b, or application information 204c. In at least one embodiment, the at least one subsequent program application data can correspond to a different field of the program application 202 than that of the reference program application data object. That is, the at least one subsequent program application data can be information for a field for which data has not been received yet. The reference program application data object can be the initial program application data object, an additional initial program application data object, or a subsequent reference program application data object that was already generated.

In at least one embodiment, the at least one subsequent program application data can correspond to a same field of the program application 202 as that of the reference program application data object. That is, the at least one subsequent program application data can be an update, or modification to a field for which data was previously received.

In some embodiments, the at least one subsequent program application data can include at least a first subsequent program application data and a second subsequent program application data received after the first subsequent program application data. That is, receiving subsequent program application data at 502 can be repeated.

In at least one embodiment, the first subsequent program application data and the second subsequent program application data correspond to a same field. That is, data can be received for a particular field first and then that particular field can be updated or modified later. However, the user may also determine that they would like to revert to the first subsequent program application data instead of the second subsequent program application data. In at least one embodiment, the user can operate computing device 120 to generate and transmit a rollback indicator for the second subsequent program application data.

At 504, the application management system 110 can store the at least one subsequent program application data on the one or more storage devices 116 or 130. Storing the at least one subsequent program application data on the one or more storage devices 116 or 130 can be similar to storing the initial program application data at 304 or the additional initial program application data at 414. The subsequent program application data can be stored with the initial program application data and the additional initial program application data, namely the same databases.

As noted above, receiving subsequent program application data at 502 can be repeated. Likewise, storing subsequent program application data at 504 can be repeated. That is, a first subsequent program application data can be received and stored followed by a second subsequent program application data that is received and stored.

At 506, the application management system 110 can receive a subsequent submission indicator that at least one program application of the one or more program applications is ready for submission. Similar to 402 and 416, the subsequent submission indicator can be received from computing device 120 associated with the applicant.

At 508, the application management system 110 can generate a subsequent program application data object based on at least a portion of a reference program application data object stored on the one or more storage devices 116 or 130 and the at least one subsequent program application data received since the reference program application data object for the at least one program application was generated.

In cases when the first subsequent program application data and the second subsequent program application data correspond to a same field, the application management system 110 can generally use the second subsequent program application data to generate the subsequent program application data object. That is, the application management system 110 can generally use the data that was received later as the current data for that field. However, in response to receiving a rollback indicator, the application management system 110 can use the first subsequent program application data to generate the subsequent program application data object.

In at least one embodiment, the application management system 110 can use the subsequent program application data received since the reference program application data object was generated for the one or more same fields to generate the subsequent program application data object. Generally, when program application data is received for the same field, whether it be as initial program application data, additional initial program application data, or subsequent program application data, the data that was received later will be used as the current data for that field when generating a program application data object.

At 510, the application management system 110 can, in response to receiving the subsequent submission indicator, determine whether the subsequent program application data is validated.

In at least one embodiment, the application management system 110 can determine whether the at least one subsequent program application data is validated by transmitting the subsequent program application data object to the computing device associated with the applicant 120b. The computing device associated with the applicant 120b can display the subsequent program application data object for the user to review.

The user at computing device 120b can review the subsequent program application data and the subsequent program application data object at the computing device 120 and determine whether to approve or reject the subsequent program application data and the subsequent program application data object. That is, the user can operate computing device 120 to generate and transmit an approval indicator or a rejection indicator.

Application management system 110 can receive either an approval indicator or a rejection indicator for the subsequent program application data. In response to receiving an approval indicator for the subsequent program application data object, the application management system 110 can determine that the subsequent program application data is validated. In response to receiving a rejection indicator for the subsequent program application data object, the application management system 110 can determine that the at least one subsequent program application data is not validated.

If the subsequent program application data is validated, the method 500 can proceed to 512. At 512, the application management system 110 can store the subsequent program application data object on the one or more storage devices 116 or 130. The subsequent program application data objects can be stored with the initial program application data object and the additional initial program application data object, namely the same databases. Application management system 110 can also designate the subsequent program application data object as the reference program application data object for the at least one program application at 514 and transmit the subsequent program application data object 602 and a revocation request for a prior submitted program application data object to the corresponding institutional system 250 at 516.

Otherwise, that is, if the subsequent program application data is not validated, the method can proceed to 518. At 518, the application management system 110 can discard the at least one subsequent program application data from the one or more storage devices 116 or 130 and the subsequent program application data object. In at least one embodiment, the application management system 110 can generate a rollback indicator to discard the at least one subsequent program application data from the one or more storage devices 116 or 130 and the subsequent program application data object.

In some embodiments, a portion of the subsequent program application data can be validated and a portion of the subsequent program application data cannot be validated. The application management system 110 can discard the respective subsequent program application data that was not validated and retain the subsequent program application data that was validated.

In at least one embodiment, the application management system 110 can also transmit a notification to the computing device associated with the applicant 120b that the respective program application data is not validated.

In at least one embodiment, the application management system 110 can determine that the subsequent program application data received at 502 relates to a plurality of program applications. For example, the subsequent program application data can be applicant information 204b, such as a phone number or address. As such, 508 can involve generating a plurality of subsequent program application data objects. Each subsequent program application data object can be for a program application that includes the applicant information that the subsequent program application data relates to. Furthermore, the application management system 110 can perform each of 512, 514, 516 or 518 for each of the plurality of subsequent program application data objects.

Figure 8:
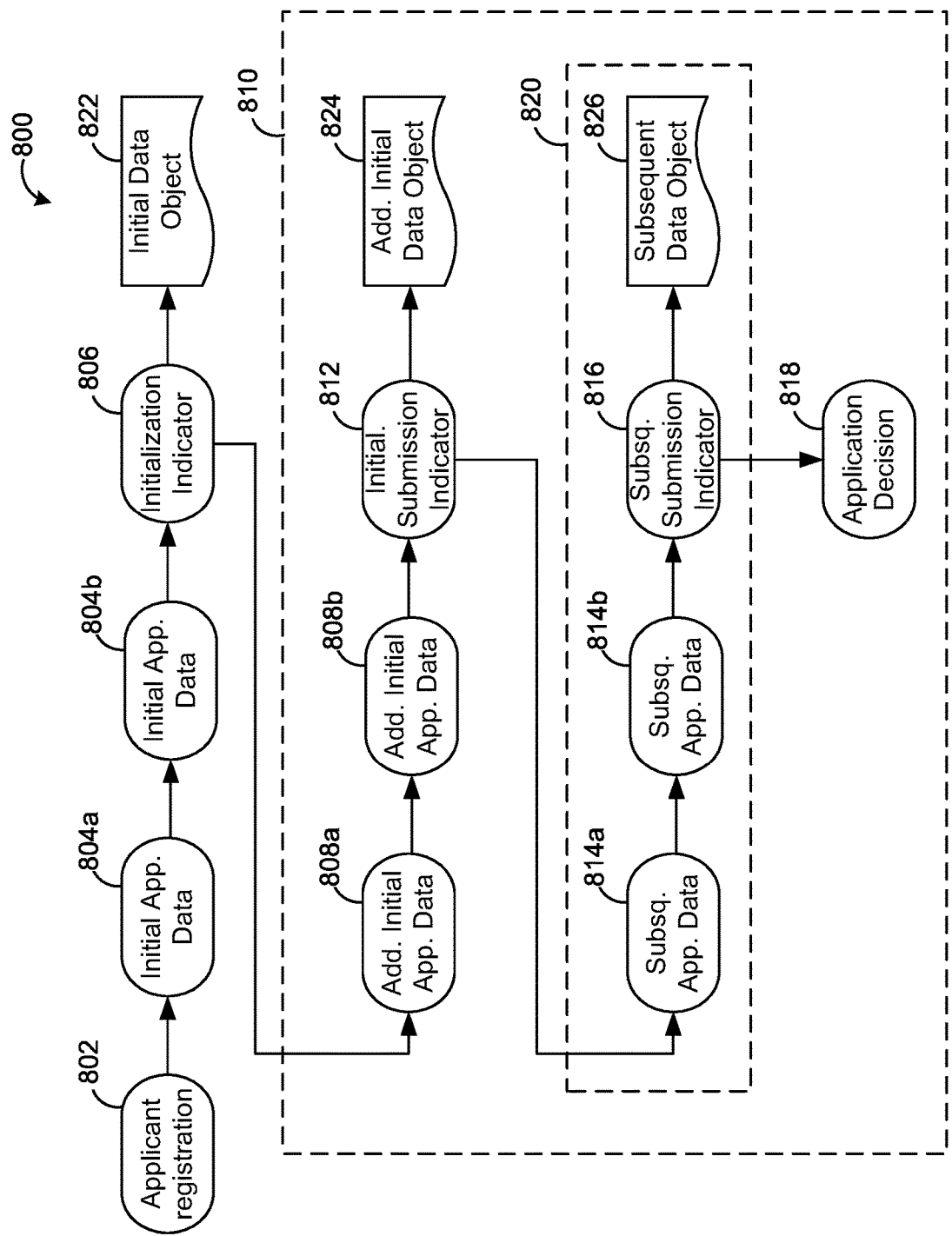
FIG. 8 is a block diagram of an example workflow of a program application in accordance with an example embodiment.

Reference is now made to FIG. 8, which illustrates a block diagram 800 of an example workflow of a program application, in accordance with an example embodiment. The workflow 800 can begin with the application management system 110 receiving an applicant registration 802 and initial program application data 804a, 804b (collectively referred to as initial program application data 804). The applicant registration 802 and initial program application data 804 can be provided by one or more computing devices 120. Although only two initial program application data 804a and 804b are shown in FIG. 8, any number of initial program application data 804 can be received prior to receipt of an initialization indicator 806.

The application management system 110 can receive the initialization indicator 806. The initialization indicator 806 can be received from a computing device on behalf of the applicant, such as computing device 120a or 120b. Upon receiving the initialization indicator 806, the application management system 110 can process the application registration 802 and the initial program application data 804 to generate an initial program application data object 822.

After the application registration 802 has been processed, the application management system 110 can receive additional initial program application data 808a and 808b (collectively referred to as additional initial program application data 808). The additional initial program application data 808 can be provided by one or more computing devices 120. Although only two additional initial program application data 808a and 808b are shown in FIG. 8, any number of additional initial program application data 808 can be received prior to receipt of an initial submission indicator 812.

The application management system 110 can receive the initial submission indicator 812. The initial submission indicator 812 can be received from a computing device associated with the applicant, such as computing device 120b. Upon receiving the initial submission indicator 812, the application management system 110 can process the initial submission, namely to use the initial data object 822 and the additional initial program application data 808 to generate an additional initial program application data object 824. The additional initial program application data object 824 can be transmitted to an institutional system, such as institutional system 250 (not shown in FIG. 8).

After the initial submission has been processed, the application management system 110 can receive subsequent program application data 814a and 814b (collectively referred to as subsequent program application data 814). The subsequent program application data 814 can be provided by one or more computing devices 120. Although only two subsequent program application data 814a and 814b are shown in FIG. 8, any number of subsequent program application data 814 can be received prior to receipt of a subsequent submission indicator 816.

The application management system 110 can receive the subsequent submission indicator 816. The subsequent submission indicator 816 can be received from a computing device associated with the applicant, such as computing device 120b. Upon receiving the subsequent submission indicator 816, the application management system 110 can process the subsequent submission, namely to use the additional initial data object 824 and the subsequent program application data 814 to generate a subsequent program application data object 826. The subsequent program application data object 826 can be transmitted to the institutional system 250 along with a request to revoke the previously submitted program application, namely additional initial program application data object 824 (not shown in FIG. 8).

The institutional system 250 can decide whether or not to accept the applicant on the basis of the subsequent program application data object 826, containing up to date information. The institutional system 250 can provide an application decision 818 to the application management system 110. In some embodiments, the application management system 110 can transmit the application decision 818 to the one or more computing devices 120 (not shown in FIG. 8).

As shown in dashed lines, the process 820 of receiving subsequent application data 814 and a subsequent submission indicator 816 can be reiterated for the same program application. Also shown in dashed lines, the process 810 of receiving additional initial program application data 808, an initial submission indicator 812, subsequent program application data 814, and a subsequent submission indicator 816 can be reiterated for additional programs.

Furthermore, although only one subsequent program application data object 826 is shown in FIG. 8, more subsequent program application data objects can be generated. For example, the subsequent program application data can be included in a plurality of program application and a subsequent program application data object 826 can be generated for each program application that includes the subsequent program application data. Accordingly, although only one application decision 818 is shown in FIG. 8, a plurality of application decisions can correspond to the plurality of subsequent program application data objects 826.

Figure 9:
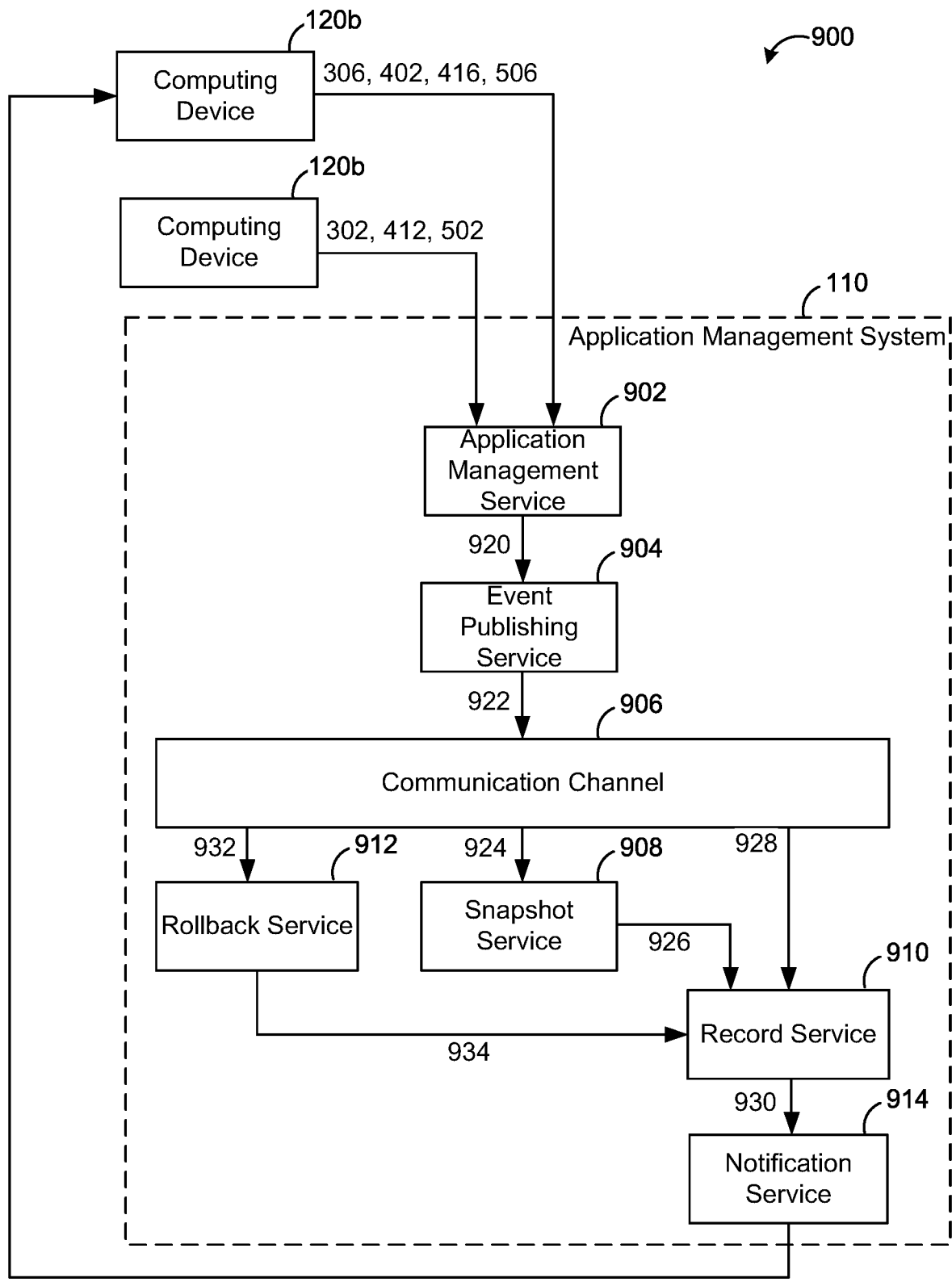
FIG. 9 is a block diagram of components interacting with an example application management system, in accordance with another example embodiment.

In at least one embodiment, the at least one processor can include a plurality of processors with each processor being configured to perform different dedicated tasks, or provide dedicated services. Reference is now made to FIG. 9, which illustrates a block diagram 900 of an example application management system 110 having a plurality of processors to provide dedicated services.

As shown in FIG. 9, dedicated services can include an application management service 902, an event publishing service 904, a communication channel 906, a snapshot service 908, a record service 910, a rollback service 912, and a notification service 914. Each service can be provided by one or more dedicated processors. Alternatively, one or more processors can be configured to provide a subset of the dedicated services.

The application management service 902 can communicate 920 to the event publishing service 904 when events occur. For example, the application management service 902 can communicate 920 to the event publishing service 904 when application data or indicators are received or stored on the one or more storage devices 116 or 130.

The event publishing service 904 can publish 922 event messages to the communication channel 906. Example event messages can include, but are not limited to, initial event messages, cumulative change event messages, elementary change event messages, and rollback event messages. Other services, such as the snapshot service 908, the record service 910, and the rollback service 912, can receive event messages from the communication channel 906.

In at least one embodiment, the event publishing service 904 can publish 922 an initial event message when the initialization indicator 806 is received at 306. In at least one embodiment, the event publishing service 904 can publish 922 a cumulative change event message when the initial submission indicator 812 is received at 402 or 416. The event publishing service 904 can publish 922 an elementary change event message when the at least one additional initial program application data 808 or at least one subsequent program application data 814 is stored on the one or more storage devices 116 or 130 at 412 or 502.

In some embodiments, the event publishing service 904 can publish 922 an elementary change event message when each additional initial program application data 808 or each subsequent program application data 814 is stored at 414 or 504. For example, the event publishing service 904 can publish 922 a first elementary change event message when a first subsequent program application data 814*a* is stored at 504. The event publishing service 904 can also publish 922 a second elementary change event message when a second subsequent program application data 814*b* is stored at 504.

In at least one embodiment, the event publishing service 904 can publish 922 a rollback event message when a rollback indicator is received or generated. For example, a rollback indicator can be received by the application management service 902 from a computing device 120. A user can operate the computing device 120 to transmit a rollback indicator to revert to an earlier program application data, that is, to discard a later program application data (e.g., additional initial program application data or subsequent program application data). In another example, a rollback indicator can be generated by the application management service 902 when program application data is not validated at 428 or 518.

The communication channel 906 can receive event messages from the event publishing service 904. In at least one embodiment, the communication channel 906 can determine a target recipient, namely a service, for an event message. The communication channel 906 can transmit the event message to the target recipient. For example, the communication channel 906 can determine that initial event messages and cumulative change event messages should be transmitted 924 to the snapshot service 908. The communication channel 906 can determine that elementary change event messages should be transmitted 928 to the record service 910. The communication channel 906 can determine that rollback event messages should be transmitted 932 to the rollback service 912.

The snapshot service 908 can receive an event message from the communication channel 906 and operate in response to the event message, namely, to generate a program application data object. For example, in response to receiving an initial event message from the communication channel 906, the snapshot service 908 can generate 304 the initial program application data object 822. To generate the initial program application data object 822, the snapshot service 908 can retrieve all data available for the program application 202, namely program information 204*a*, applicant information 204*b*, and application information 204*c*. The data available for the program application 202 can generally be the initial program application data 804 received at 302.

In another example, in response to receiving a cumulative change event message from the communication channel 906, the snapshot service 908 can generate 418, 508 the additional initial program application data object 824 or a subsequent program application data object 826 if a reference program application data object already exists (i.e., an initial program application data object 822, an additional initial program application data object 824, or a subsequent program application data object 826 already exists). To generate 418 the additional initial program application data object 824, the snapshot service 908 can retrieve all data available for the program application 202 since the initial program application data object 822 was generated, namely any additional initial program application data 808, such as program information 204*a*, applicant information 204*b*, and application information 204*c* that was not included in the initial program application data object 822. The snapshot service 908 can provide 926 the initial program application data object 824 to the record service 910.

To generate 508 the subsequent program application data object 826, the snapshot service 908 can retrieve all data available for the program application 202 since the reference program application data object was generated, namely any subsequent program application data 814, such as any program information 204*a*, applicant information 204*b*, and application information 204*c* that was not included in the reference program application data object. The snapshot service 908 can provide 926 the subsequent program application data object 826 to the record service 910.

In at least one embodiment, the cumulative change event message can include a payload attribute. Generally, cumulative change event messages relate to the generation of a subsequent program application object 826 and the payload attribute can include validated data changes from the current reference program application data object for the at least one program application 202. That is, the payload attribute can include any program information 204*a*, applicant information 204*b*, and application information 204*c* that was not included in the current reference program application data object. The snapshot service 908 can generate 508 the subsequent program application data object 826 using the current reference program application data object and the payload attribute. The snapshot service 908 can provide 926 the subsequent program application data object 826 to the record service 910.

The record service 910 can receive each program application data object (e.g., the initial program application data object 822, the additional initial program application data object 824, and the subsequent program application data object 826) from the snapshot service 908. Upon receipt of each of program application data object, the record service 910 can store a record 424 designating that program application data object as the reference program application data object for the at least one program application 202. Furthermore, when the record service 910 receives a subsequent program application data object 826, the record service 910 can also record the prior submitted program application data object for the program application 202 as being revoked. The record service 910 can record a reference program application data object for each program application 202. Thus, the record service can maintain a history of each program application 202.

The record service 910 can also store records for data that has been included in a program application data object (i.e., initial program application data object 822, the additional initial program application data object 824, and the subsequent program application data object 826). As a result, program application data received and not included in a program application data object can be readily identified and included in future program application data objects, that is additional iterations of process 810 or 820.

The record service 910 can also receive an event message from the communication channel 906 and operate in response to the event message, namely, to generate and store a record. For example, in response to receiving an elementary change event message from the communication channel 906, the record service 910 can generate and store a record corresponding to the at least one additional initial program application data 808 or subsequent program application data 814.

Furthermore, the record service 910 can receive a plurality of elementary change event messages. The record service 910 generate and store a record corresponding to each additional initial program application data 808 or each subsequent program application data 814 in response to receiving each elementary change event message of the plurality of elementary change event messages. For example, the record service 910 can receive a first elementary change event message and generate and store a record corresponding to a first subsequent program application data 814a. The record service 910 can also receive a second elementary change event message and generate and store a record corresponding to a second subsequent program application data 814b.

The rollback service 912 can receive an event message from the communication channel 906 and operate in response to the event message, namely, to discard program application data or a program application data object. For example, in response to receiving a rollback event message from the communication channel 906, the rollback service 912 can discard an initial program application data object 824 or a subsequent program application data object 826 that contains data that was not validated at 428 or 518. The rollback service 912 can provide 934 each discarded program application data object to the record service 910.

Upon receipt of a discarded program application data object from the rollback service, the record service 910 can store a record designating the earlier program application data object as the reference program application data object for the at least one program application 202.

The rollback service 912 can also discard later program application data and revert to earlier program application data. The rollback service 912 can provide 934 each discarded program application data to the record service 910.

Upon receipt of a discarded program application data from the rollback service, the record service 910 can store a record designating the later program application data as not to be included in a program application data object. As a result, earlier program application data will be included in future program application data objects instead of the later program application data.

The notification service 914 can generate and transmit notifications 936 to the computing device 120. For example, the notification service 914 can generate and transmit notifications to the computing device 120 when application data is not validated 408, 428, or 518. The notification service 914 can also generate and transmit notifications to the computing device 120 when a program application 202 has been submitted 406, 426, or 516 to an institutional system 250, namely when a program application data object has been stored 930.

As previously mentioned, in at least one embodiment, a computing device 120a can provide program application data on behalf of the applicant. The notification service 914 can generate a notification to a computing device associated with the applicant 120b that program application data has been received. Upon receipt of the notification, an applicant can operate the computing device 120b to provide the initialization indicator 806, the initial submission indicator 812, or the subsequent submission indicator 816. The notification service 914 can also generate and transmit notifications to the computing device associated with the applicant 120b related to validating the program application data at 404, 420, and 510.

The example systems and method described herein for managing program application data can avoid the need to perform manual review of submitted program applications in order to identify where discrepancies may exist, or which submitted program applications contain data that requires revision or update and avoid the need to perform. Furthermore, the automatic generation and storage of program application data objects can improve the timeliness of such program application data changes, thereby reducing the possibility that the submission period closes prior to resubmission of a program application. As well, the generation and storage of program application data objects at particular stages of a program application workflow can optimize the computational resource requirements of the system. Additionally, such generation and storage of program application data objects can increase the robustness of the system with respect to fault tolerance, disaster recovery, and security.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g., ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims.

We claim:

1. A computer-implemented method for managing program application data, the method comprising operating at least one processor to:
    receive, from at least one computing device on behalf of an applicant, initial program application data for the applicant, the initial program application data corresponding to one or more fields of one or more program applications, the at least one computing device on behalf of the applicant comprising a computing device associated with the applicant;
    store the initial program application data on one or more storage devices;
    receive, from the at least one computing device on behalf of the applicant, an initialization indicator that at least one program application of the one or more program applications is to be created;
    generate an initial program application data object for the at least one program application, the initial program application data object comprising the initial program application data;
    store the initial program application data object on the one or more storage devices; and
    designate the initial program application data object as the reference program application data object for the at least one program application.

2. The method of claim 1, comprising operating the at least one processor to:
    publish event messages to a communication channel; and
    receive a particular event message from the communication channel and operate in response to receiving the event message.

3. The method of claim 2, comprising operating the at least one processor to:
    publish an initial event message to the communication channel when the initialization indicator is received; and
    generate the initial program application data object in response to receiving the initial event message from the communication channel.

4. The method of claim 1, comprising operating the at least one processor to:
    receive, from the computing device associated with the applicant, an initial submission indicator that at least one program application of the one or more program applications is ready for submission;
    in response to receiving the submission indicator, determine whether the initial program application data is validated; and
    if the initial program application data is validated, transmit the initial program application data object to a corresponding institutional system;
    otherwise, transmit a notification to the computing device associated with the applicant that the initial program application data is not validated.

5. The method of claim 4, comprising operating the at least one processor to:
    receive, from the at least one computing device on behalf of an applicant, at least one subsequent program application data for the applicant, the at least one subsequent program application data corresponding to the one or more fields of the one or more program applications;
    store the at least one subsequent program application data on the one or more storage devices;
    receive, from the computing device associated with the applicant, a subsequent submission indicator that at least one program application of the one or more program applications is ready for submission;
    in response to receiving the subsequent submission indicator, generate a subsequent program application data object based on at least a portion of a reference program application data object stored on the one or more storage devices and the at least one subsequent program application data received since the reference program application data object for the at least one program application was generated; and determine whether the at least one subsequent program application data is validated; and if the at least one subsequent program application data is validated, store the subsequent program application data object on the one or more storage devices;

designate the subsequent program application data object as the reference program application data object for the at least one program application; and transmit the subsequent program application data object and a revocation request for a prior submitted program application data object to the corresponding institutional system;

otherwise, discard the at least one subsequent program application data from the one or more storage devices and the at least one subsequent program application data object.

6. The method of claim 5, wherein operating the at least one processor to determine whether the at least one subsequent program application data is validated comprises operating the at least one processor to:

transmit the subsequent program application data object to the computing device associated with the applicant for display at the computing device associated with the applicant;

receive, from the computing device associated with the applicant, either an approval indicator or a rejection indicator for the subsequent program application data object;

in response to receiving an approval indicator for the subsequent program application data object, determine that the at least one subsequent program application data is validated; and in response to receiving a rejection indicator for the subsequent program application data object, determine that the at least one subsequent program application data is not validated.

7. The method of claim 5, wherein operating the at least one processor to discard the at least one subsequent program application data object further comprises operating the at least one processor to transmit a notification to the computing device associated with the applicant that a respective program application data is not validated.

8. The method of claim 5, wherein operating the at least one processor to generate a subsequent program application data object based on at least a portion of a reference program application data object stored on the one or more storage devices and the at least one subsequent program application data received since the reference program application data object for the at least one program application was generated comprises:

operating the at least one processor to generate a plurality of subsequent program application data objects for a plurality of program applications, each subsequent program application data based on at least a portion of a reference program application data object stored on the one or more storage devices for that program application and the at least one subsequent program application data received since the reference program application data object for that program application was generated.

9. The method of claim 5, wherein the at least one subsequent program application data for the applicant comprises at least a first subsequent program application data and a second subsequent program application data received after the first subsequent program application data.

10. The method of claim 9, wherein the first subsequent program application data and the second subsequent program application data correspond to a same field.

11. The method of claim 10, wherein operating the at least one processor to generate a subsequent program application data object based on at least a portion of a reference program application data object stored on the one or more storage devices and the at least one subsequent program application data received since the reference program application data object for the at least one program application was generated comprises operating the at least one processor to:

in response to receiving a rollback indicator for the same field, use the first subsequent program application data for the same field to generate the subsequent program application data object;

otherwise, use the second subsequent program application data for the same field to generate the subsequent program application data object.

12. The method of claim 5, comprising operating the at least one processor to:

publish a cumulative change event message to a communication channel when the subsequent submission indicator is received;

generate the subsequent program application data object in response to receiving the cumulative change event message from the communication channel; and generate and store a record designating the subsequent program application data object as the reference program application data object for the at least one program application.

13. The method of claim 12, comprising operating the at least one processor to:

publish an elementary change event message to the communication channel when the at least one subsequent program application data is stored on the one or more storage devices; and generate and store a record corresponding to the at least one subsequent program application data in response to receiving the elementary change event message.

14. The method of claim 13, wherein:

the at least one subsequent program application data for the applicant comprises at least a first subsequent program application data and a second subsequent program application data received after the first subsequent program application data;

the method comprising operating the at least one processor to publish a first elementary change event message to the communication channel when the first subsequent program application data is stored on the one or more storage devices;

publish a second elementary change event message to the communication channel when the second subsequent program application data is stored on the one or more storage devices; and generate and store records corresponding to the first and second subsequent program application data in response to receiving the first and second elementary change event messages, respectively.

15. The method of claim 5, wherein one or more subsequent program application data received since the reference program application data object was generated and the reference program application data object correspond to one or more same fields.

16. The method of claim 15, wherein operating the at least one process to generate a subsequent program application data object based on at least a portion of a reference program application data object stored on the one or more storage devices and the at least one subsequent program application data received since the reference program application data object for the at least one program application was generated comprises operating the at least one processor to use the subsequent program application data received since the reference program application data object was generated for the one or more same fields to generate the subsequent program application data object.

17. The method of claim 5, comprising:
storing at least one of the initial program application data object or the subsequent program application data object on the one or more storage devices comprises storing at least one of the initial program application data object or the subsequent program application data object in a snapshot storage device; and
storing at least one of the initial program application data or the subsequent program application data for the one or more fields of the one or more program applications on the one or more storage devices comprises storing at least one of the initial program application data or the subsequent program application data for the one or more fields of the one or more program applications in a program application storage device.

18. The method of claim 1, comprising operating the at least one processor to:
receive, from the at least one computing device on behalf of the applicant, at least one additional initial program application data for the applicant, the at least one additional initial program application data corresponding to the one or more fields of the one or more program applications;
store the at least one additional initial program application data on the one or more storage devices;
receive, from the computing device associated with the applicant, an initial submission indicator that at least one program application of the one or more program applications is ready for submission;
in response to receiving the initial submission indicator, generate an additional initial program application data object based on the initial program application data object stored on the one or more storage devices and the at least one additional initial program application data received since the initial program application data object was generated;
determine whether the initial program application data and the at least one additional initial program application data is validated;
if the initial program application data and the at least one additional initial program application data is validated, store the additional initial program application data object on the one or more storage devices;
designate the additional initial program application data object as the reference program application data object for the at least one program application; and
transmit the additional initial program application data object to a corresponding institutional system;
otherwise, discard the additional initial program application data from the one or more storage devices and the at least one additional initial program application data object.

19. The method of claim 18, wherein operating the at least one processor to determine whether the at least one initial program application data and the at least one additional initial program application data is validated comprises operating the at least one processor to:
transmit the additional initial program application data object to the computing device associated with the applicant for display at the computing device associated with the applicant;
receive, from the computing device associated with the applicant, either an approval indicator or a rejection indicator for the additional initial program application data object;
in response to receiving an approval indicator for the additional initial program application data object, determine that the at least one additional initial program application data is validated; and
in response to receiving a rejection indicator for the additional initial program application data object, determine that the at least one additional initial program application data is not validated.

20. The method of claim 18, wherein operating the at least one processor to discard the at least one additional initial program application data object further comprises operating the at least one processor to transmit a notification to the computing device associated with the applicant that a respective program application data is not validated.

21. The method of claim 18, comprising operating the at least one processor to:
publish a cumulative change event message to a communication channel when the initial submission indicator is received;
generate the additional initial program application data object in response to receiving the cumulative change event message from the communication channel; and
generate and store a record designating the additional initial program application data object as the reference program application data object for the at least one program application.

22. The method of claim 21, comprising operating the at least one processor to:
publish an elementary change event message to the communication channel when the at least one additional initial program application data is stored on the one or more storage devices; and
generate and store a record corresponding to the at least one additional initial program application data in response to receiving the elementary change event message.

23. The method of claim 18, wherein one or more additional initial program application data received since the initial program application data object was generated and the initial program application data object correspond to one or more same fields.

24. The method of claim 23, wherein operating the at least one processor to generate an additional initial program application data object based on the initial program application data object stored on the one or more storage devices and the at least one additional initial program application data received since the initial program application data object was generated comprises operating the at least one processor to use the additional initial program application data received since the initial program application data object was generated for the one or more same fields to generate the additional initial program application data object.

25. The method of claim 18, comprising:
storing at least one of the initial program application data object or the additional initial program application data object on the one or more storage devices comprises storing at least one of the initial program application data object or the additional initial program application data object in a snapshot storage device; and storing at least one of the initial program application data or the additional initial program application data for the one or more fields of the one or more program applications on the one or more storage devices comprises storing at least one of the initial program application data or the additional initial program application data for the one or more fields of the one or more program applications in a program application storage device.

26. The method of claim 1, wherein the one or more fields of one or more program applications comprises at least one of a program information field, an application information field, and an applicant information field.

27. The method of claim 26, wherein:

the at least one program application comprises a plurality of program applications, each program application having at least one of a program information field and an application information field that is different from other program applications of the plurality of program applications; and operating the at least one processor to designate the reference program application data object for the at least one program application comprises operating the at least one processor to designate the reference program application data object for a particular program application.

* * * * *